Patented Aug. 1, 1939

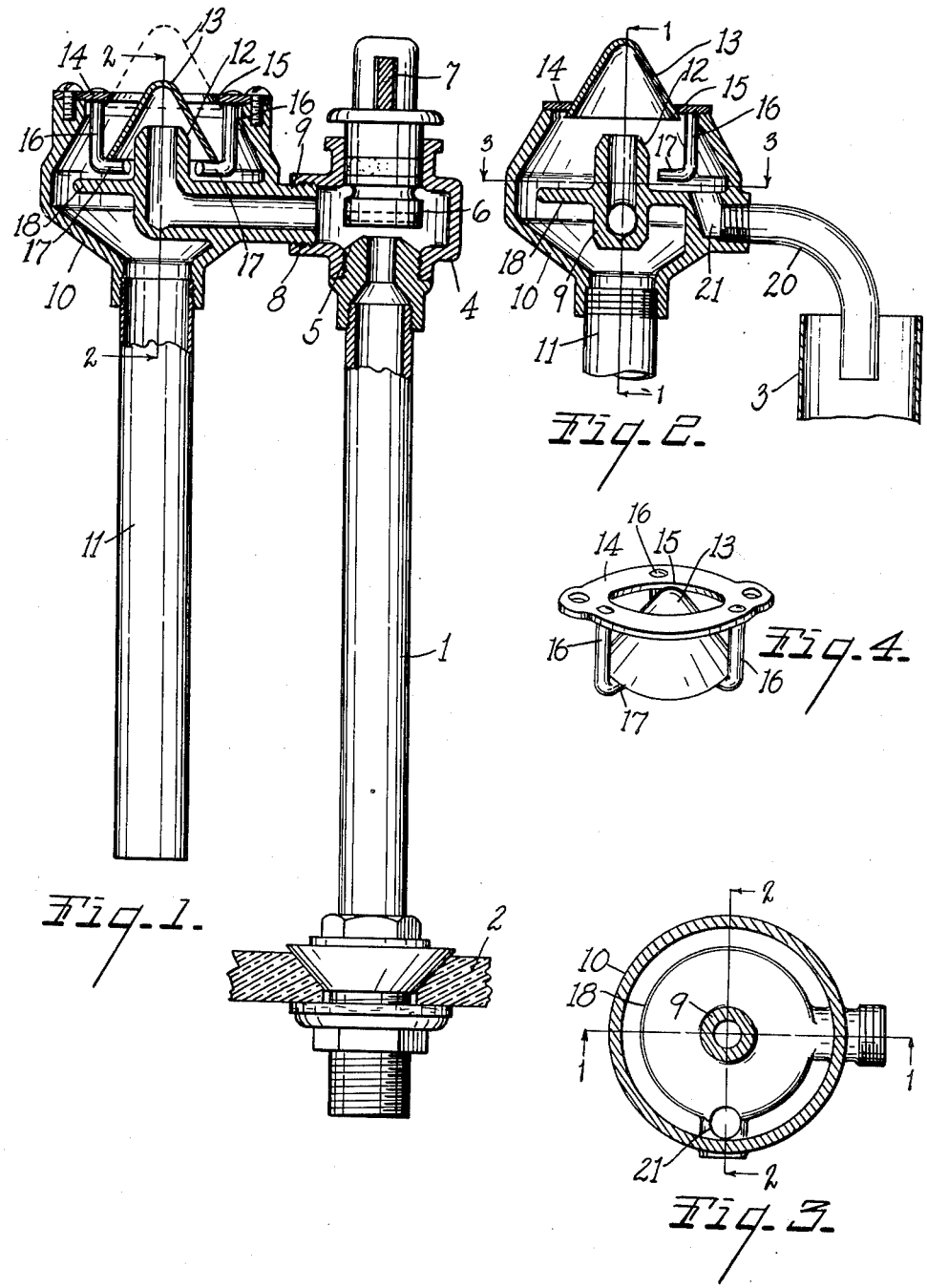

2,167,938

UNITED STATES PATENT OFFICE 2,167,938

VACUUM BREAKING BALL COCK

Herbert D. Clemmons, Sturgis, Mich., assignor to Scovill Manufacturing Company, Sturgis, Mich., a corporation of Michigan Application February 13, 1939, Serial No. 256,050

10 Claims. (Cl. 137—69)

This invention relates to improvements in vacuum breaking ball cocks.

The main objects of this invention are:

First, to provide a vacuum breaking ball cock or flushing valve combination which is highly efficient, not only effective as regards to the discharge pipe but also the refill tube.

Second, to provide an anti-siphoning device or vacuum breaker which may be readily embodied in extensively used types of ball cocks or flushing valves with little modification thereof.

Third, to provide a structure having these advantages which is not likely to become inoperative through clogging or getting out of order.

Fourth, to provide a device having the advantages described which is quite economical in the matter of parts and the assembly thereof.

Objects relating to details and economies of the invention will appear from the description to follow. The invention is defined and pointed out in the claims.

A preferred embodiment of the invention is illustrated in the accompanying drawing, in which:

Fig. 1 is a fragmentary side elevation partially in vertical section on a line corresponding to line 1—1 of Figs. 2 and 3 of a flushing valve assembly embodying my invention, the float actuated valve being shown in open position, the float and operating connections being mainly omitted and the air valve or baffle being shown in actuated or closed or air port closing position by dotted lines.

Fig. 2 is a fragmentary view partially in section on line 2—2 of Fig. 1 with the combined air valve or baffle member in its actuated position.

Fig. 3 is a horizontal section on line 3—3 of Fig. 2.

Fig. 4 is a perspective view of the valve, its seat member, and the valve cage and the valve supporting cage.

My present invention relates to a vacuum breaking device which is adapted to properly direct the discharge of water when the inlet valve of the assembly is open and to instantaneously open the delivery line to the atmosphere when the flow of fluid is discontinued thereby to break any condition of vacuum which may arise in the supply pipe and thereby prevent back siphonage. The breaking of vacuum in the supply line prevents siphoning or drawing of all polluted water through the discharge pipe into the system. While my invention is particularly designed for such an application it should be understood that the principle and structure herein described and illustrated are of broader application and in fact applicable to any case where it is desired to communicate a hydraulic transmission line with the atmosphere upon cessation of flow of fluid therein to break a vacuum in the line.

In the embodiment of my invention illustrated, 1 represents the supply pipe which is connected to a suitable source of water supply which it is desired to guard or protect by preventing back siphoning. 2 represents a tank and 3 the overflow of the tank. The flushing valve is not illustrated as a suitable mechanism will be readily understood by those skilled in the art.

The inlet valve casing 4 is mounted upon the pipe 1 and is provided with an upwardly facing valve seat 5 with which the plunger valve 6 coacts.

7 illustrates one member of a float valve mechanism for controlling the opening and closing of the valve.

The valve casing 4 has an internally threaded opening 8 at one side thereof adapted to receive the nipple 9 of the discharge chamber 10. The discharge pipe or hush tube 11, as it is commonly called, is threaded into the lower end of the chamber 10.

The inlet connection 9 terminates in an upwardly directed nozzle 12 disposed centrally of the chamber 10. This nozzle is adapted to discharge centrally within the conical combined valve and baffle member 13. The discharge chamber 10 is provided with a top plate 14 having a central opening 15 therein adapted to be closed by the member 13 when it is lifted by the impact of the water thereon, it being shown by full lines in closed position in Fig. 2 and by dotted lines in Fig. 1, it being shown in its normal position by full lines in Fig. 1.

The top plate 14 is provided with a plurality of angled cage members 16 which coact to floatingly support the member 13 and when it is in its position of rest on the inwardly projecting arms 17 of the cage member 16 it is supported in spaced relation to the guard member 18. This guard member 18 is disk-like in form and is supported centrally of the discharge chamber below the tip or port of the nozzle and substantially above the discharge pipe 11.

When the valve 6 is open, water is discharged upwardly from the nozzle within the member 13, lifting it to its closed position and closing the air port or opening 15 and holding it in that position as long as the water continues to flow with any force from the nozzle. However, as soon as the flow of water ceases, the member 13 drops to its normal position by gravity and is then supported with its lower edge in spaced relation to the guard member 18 so that air can enter through the opening 15 and flow around the member 13 to the nozzle and break any vacuum that may exist within the supply connection. This prevents withdrawing water through the pipe 11. Sometimes this vacuum occurs during or immediately following the delivery of water from the supply system with the result that conditions may be produced where there is considerable resurgence of the water in the pipe 11 or in the chamber 10. To prevent this resurging water entering the supply system, I provide the guard 18 and this effectively deflects the water from the nozzle or discharge port of the supply system. It will be understood that this surging action is momentary and the nozzle is by this means effectively guarded even from splashing which might result from the resurging action.

I also guard the refill tube 20 from any siphoning action by having the supply passage 21 therefor open upwardly into the chamber 10 above the guard member 18, see Fig. 2.

With the parts thus arranged, clogging or wedging thereof which would render them inoperative is extremely unlikely even where the device has been allowed to stand for a long time between operations.

While I contemplate embodying my invention as a complete valve assembly, one of the advantages of the vacuum breaker device proper is that it can be readily applied to various types of flushing valves or ball cocks now on the market, the discharge pipe connection commonly employed being removed and my vacuum breaker assembly being substituted therefor.

In my device, the line is open to the atmosphere at all times when the baffle member is not subjected to the positive pressure in the supply line. Even when the pressure of the discharged water is not such as to seat the baffle member in its valve position, it serves to prevent water being discharged therethrough and owing to its shape, it directs the water downwardly to the discharge pipe.

It will be noted that the baffle member is supported in substantially spaced relation to the guard member and that the guard member projects substantially beyond the periphery of the baffle member which renders the device highly effective.

I have illustrated and described my improvements in an embodiment which I consider very practical. I have not attempted to illustrate or describe certain embodiments and adaptations which I contemplate as it is believed that this disclosure will enable those skilled in the art to embody or adapt my improvements as may be desired.

Having thus described my invention, what I claim as new and desire to secure by Letters Patent, is:

1. A vacuum breaker comprising a discharge chamber having a downwardly directed discharge at the bottom thereof and a central opening to the atmosphere at the top thereof, an upwardly directed liquid delivery nozzle disposed centrally of said chamber, a disk-like guard member disposed centrally within said chamber in surrounding relation to said nozzle and substantially below the tip thereof, a conical valve for said air opening disposed above said guard member, a cage for supporting said valve centrally above said nozzle to receive the impact of liquid discharged therefrom which acts to close the valve, said cage being adapted to support the valve in its open position with its lower edge in spaced relation to said guard, a refill tube, and a supply passage therefor opening to said chamber above said guard member.

2. A vacuum breaker comprising a discharge chamber having a downwardly directed discharge at the bottom thereof and a central opening to the atmosphere at the top thereof, an upwardly directed liquid delivery nozzle disposed centrally of said chamber, a disk-like guard member disposed centrally within said chamber in surrounding relation to said nozzle and substantially below the tip thereof, a conical valve for said air opening disposed above said guard member to receive the impact of liquid discharged therefrom which acts to close the valve, a refill tube, and a supply passage therefor opening to said chamber above said guard member.

3. A vacuum breaker comprising a discharge chamber having a downwardly directed discharge at the bottom thereof and a central opening to the atmosphere at the top thereof, an upwardly directed liquid delivery nozzle disposed centrally of said chamber, a disk-like guard member disposed centrally within said chamber in surrounding relation to said nozzle and substantially below the tip thereof, a conical valve for said air opening disposed above said guard member, and a cage for supporting said valve centrally above said nozzle to receive the impact of liquid discharged therefrom which acts to close the valve, said cage being adapted to support the valve in its open position with its lower edge in spaced relation to said guard.

4. A vacuum breaker comprising a discharge chamber having a downwardly directed discharge at the bottom thereof and a central opening to the atmosphere at the top thereof, an upwardly directed liquid delivery nozzle disposed centrally of said chamber, a disk-like guard member disposed centrally within said chamber in surrounding relation to said nozzle and substantially below the tip thereof, and a conical valve for said air opening disposed above said guard member to receive the impact of liquid discharged therefrom which acts to close the valve.

5. A vacuum breaker comprising a discharge chamber having a downwardly directed discharge pipe and a central air opening at the top thereof, an upwardly directed liquid delivery port disposed centrally of said chamber, a valve for said air port, a cage for supporting said valve centrally of said chamber and centrally relative to said discharge port, and a horizontally disposed guard member for said port extending substantially beyond the periphery of the valve and acting to deflect an upward surge within said chamber from said port.

6. A vacuum breaker comprising a discharge chamber having a downwardly directed discharge pipe and a central air opening at the top thereof, an upwardly directed liquid delivery port disposed centrally of said chamber, a valve for said air port disposed centrally relative to said discharge port, and a horizontally disposed guard member for said port acting to deflect an upward surge within said chamber from said port and valve when the valve is in open position.

7. A vacuum breaker comprising a delivery chamber having a centrally disposed air opening at the top thereof and a downwardly directed discharge pipe at the bottom thereof, an upwardly directed delivery nozzle disposed centrally of said chamber, a conical combined baffle and valve for said air opening disposed above said nozzle, a guard member for said nozzle disposed below the top of the nozzle centrally within said chamber, and means for floatingly supporting said valve in position to receive the impact of the water discharged from the nozzle centrally thereof and to support the valve with the lower edge thereof in spaced relation to the guard member to permit passage of air through the air opening around the valve and to the nozzle.

8. A vacuum breaker comprising a delivery chamber having a centrally disposed air opening at the top thereof and a downwardly directed discharge pipe positioned centrally thereof, an upwardly directed delivery nozzle disposed centrally in said chamber, a conical baffle floatingly supported above said nozzle to receive the impact of the water from the nozzle centrally thereof, a guard member for said nozzle disposed below the tip thereof and centrally of said chamber, and a refill tube passage opening to said chamber above said guard.

9. A vacuum breaker comprising a delivery chamber having an air opening at the top and a downwardly directed discharge pipe, a liquid inlet having an upwardly directed liquid delivery nozzle, a conical baffle floatingly supported above said nozzle in position to receive the impact of the water discharged from the nozzle centrally thereof, a guard member for said nozzle disposed within said chamber centrally above said discharge pipe and below the tip of the nozzle to deflect an upward surge within said chamber from said nozzle, and a refill tube passage opening to said chamber above said guard.

10. A vacuum breaker comprising a delivery chamber having an air opening at the top and a downwardly directed discharge pipe, a liquid inlet having an upwardly directed liquid delivery port, a baffle supported above said nozzle in position to receive the impact of the water discharged from the port, a guard member for said port disposed within said chamber above and in substantially spaced relation to said discharge pipe and below the said port to deflect an upward surge within said chamber from said port, and a refill tube passage opening to said chamber above said guard.

HERBERT D. CLEMMONS.